US012624732B2

(12) United States Patent
Courville et al.

(10) Patent No.: US 12,624,732 B2
(45) Date of Patent: May 12, 2026

(54) CONSTANT VELOCITY JOINT SPIDER AND CONSTANT VELOCITY JOINT THEREWITH

(71) Applicant: STEERING SOLUTIONS IP HOLDING CORPORATION, Saginaw, MI (US)

(72) Inventors: Jeffrey P. Courville, Frankenmuth, MI (US); Eduardo R. Mondragon-Parra, Freeland, MI (US); Jon N. Miller, Merrill, MI (US); Jenny C. Ho, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 299 days.

(21) Appl. No.: 18/204,378

(22) Filed: May 31, 2023

(65) Prior Publication Data

US 2024/0401648 A1 Dec. 5, 2024

(51) Int. Cl.
*F16D 3/205* (2006.01)
*F16D 3/202* (2006.01)

(52) U.S. Cl.
CPC .... *F16D 3/2055* (2013.01); *F16D 2003/2026* (2013.01); *Y10S 464/905* (2013.01)

(58) Field of Classification Search
CPC ........... F16D 3/2055; F16D 2003/2026; Y10S 464/905

USPC .......................................................... 464/111
See application file for complete search history.

(56) References Cited

U.S. PATENT DOCUMENTS

| | | | | |
|---|---|---|---|---|
| 7,708,644 | B2 * | 5/2010 | Izumino | F16D 3/2055 |
| | | | | 464/111 |
| 8,221,249 | B2 * | 7/2012 | Nakajima | F16D 3/2055 |
| | | | | 464/111 |
| 11,506,245 | B2 * | 11/2022 | Bono | F16D 3/30 |
| 2010/0273561 | A1 * | 10/2010 | Wakamatsu | F16D 3/2055 |
| | | | | 464/111 |

FOREIGN PATENT DOCUMENTS

DE 26 05 458 A1 * 8/1977 .................... 464/111

* cited by examiner

*Primary Examiner* — Greg Binda
(74) *Attorney, Agent, or Firm* — Dickinson Wright PLLC

(57) ABSTRACT

A constant velocity joint spider and constant velocity joint therewith, wherein the constant velocity joint spider has an annular body with a through bore extending along a central axis and a plurality of trunnions. Each trunnion has an outer surface extending radially outwardly from the annular body to a free end. Each outer surface defines at least one running surface. Each free end has a first portion having a first radius and at least one second portion having a second radius, the at least one second portion extends between the first portion and the at least one running surface. The first radius is greater than the second radius.

10 Claims, 7 Drawing Sheets

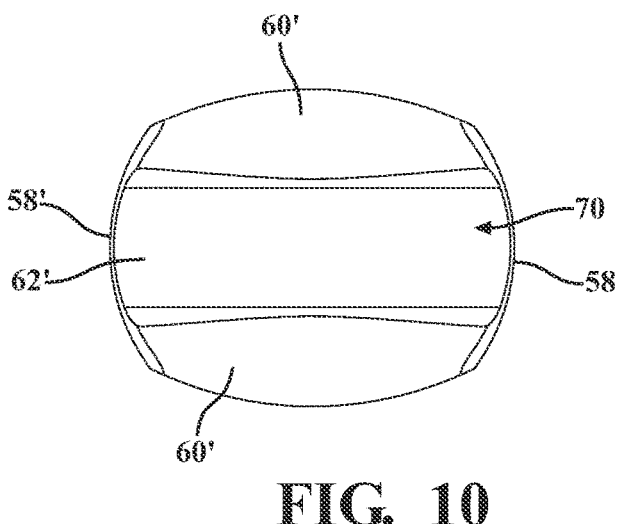
FIG. 10
FIG. 11
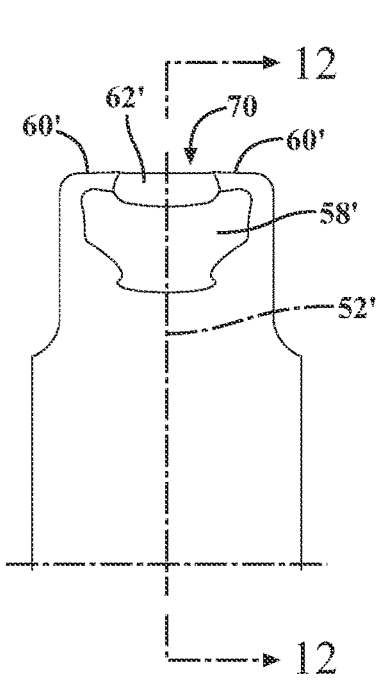
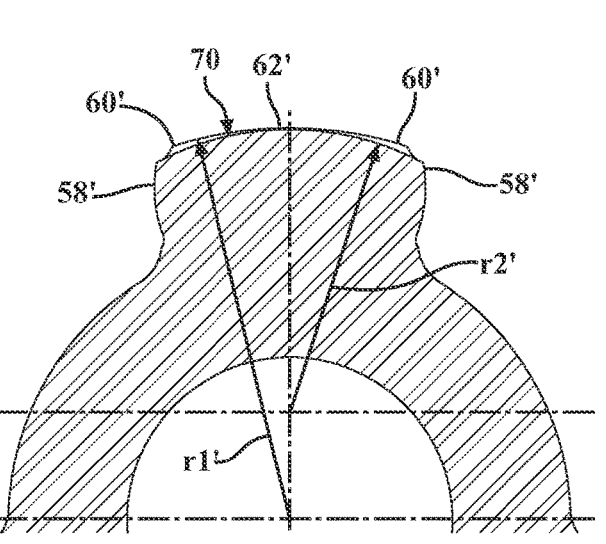
FIG. 12

CONSTANT VELOCITY JOINT SPIDER AND CONSTANT VELOCITY JOINT THEREWITH

BACKGROUND OF THE INVENTION

Tripot joints interconnect first and second rotary shafts of a vehicle to one another. The tripot joint includes a tripot housing fixed to the first shaft, with an inner surface of the tripot housing providing a plurality of roller tracks for guiding a plurality of roller assemblies rotatably carried by a spider, with the second shaft fixed to the spider.

Vehicle manufactures are continuously facing demands for advances in compact, lightweight drive axles for low cost, high performance, increased torque carry capacity, while at the same time, providing increased life and reduced noise, vibration and harshness (NVH).

Tipping and oscillation of the roller assemblies within the roller track under high torque results in high loads and friction at an interface between an inner surface of an inner race, also referred to as inner ball, of the ball assembly and an outer surface of a trunnion of the spider. Efforts are made to lubricate the interface with grease, but advancements are needed increase the flow of lubrication to prevent damaging wear at the interface.

SUMMARY OF THE INVENTION

According to an embodiment of the present disclosure, a constant velocity joint spider includes an annular body having a through bore extending along a central axis and a plurality of trunnions. Each trunnion has an outer surface extending radially outwardly from the annular body in generally transverse relation with the central axis to a free end. Each outer surface defines at least one running surface. Each free end includes a first portion having a first radius and at least one second portion having a second radius. The at least one second portion extends between the first portion and the at least one running surface, and the first radius is greater than the second radius.

In accordance with another aspect of the disclosure, a constant velocity joint includes a housing body having an inner surface bounding a bore. The bore extends along an axis between a first housing end and a second housing end. A plurality of guide channels extend axially from the first housing end toward the second housing end. The plurality of guide channels are radially spaced apart from each other about the longitudinal axis by separators. A spider has an annular body with a through bore extending along a central axis and a plurality of trunnions. Each trunnion has an outer surface extending radially outwardly from the annular body in generally transverse relation with the central axis to a free end. Each outer surface defines at least one running surface. A ball assemblies are provided, with each ball assembly being supported for rotation by the at least one running surface of a separate one of the trunnions. The free end of each trunnion includes a first portion having a first radius and at least one second portion having a second radius. The at least one second portion extends between the first portion and the at least one running surface, wherein the first radius is greater than the second radius.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 10 is a view looking generally along the arrow 10 of FIG. 8;

FIG. 11 is a side elevation view of a portion of the spider looking generally along the arrow 11 of FIG. 7; and FIG. 12 is a cross-sectional view taken generally along the line 12-12 of FIG. 11.

DETAILED DESCRIPTION

Referring now to the Figures, where the invention will be described with reference to specific embodiments, without limiting same, it is to be understood that the disclosed embodiments are merely illustrative of the invention that is embodied in various and alternative forms. The figures are not necessarily to scale; some features are exaggerated or minimized to show details of particular components. Therefore, specific structural and functional details disclosed herein are not to be interpreted as limiting, but merely as a representative basis for teaching one skilled in the art to variously employ the present invention.

Figure 1:
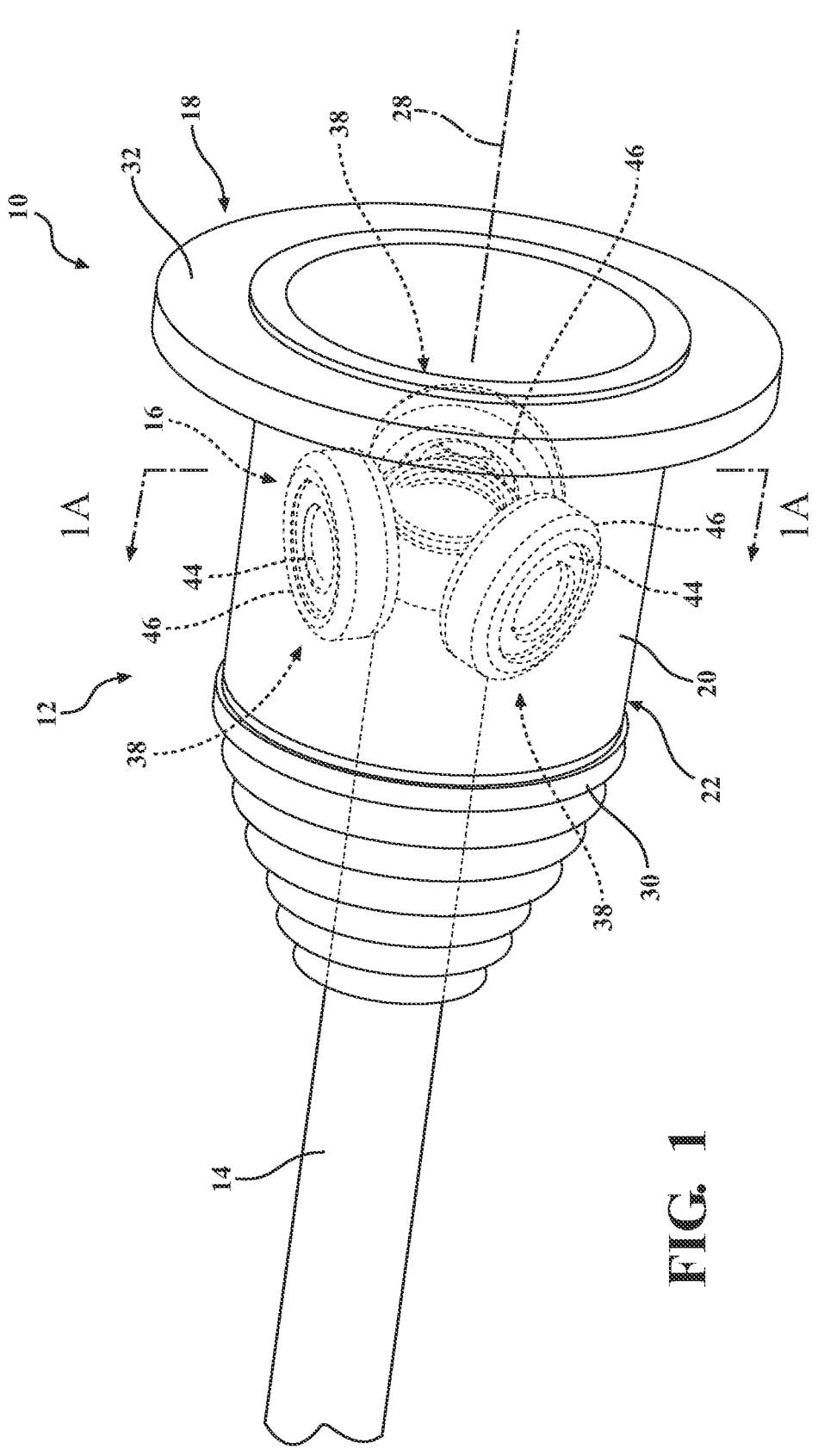
FIG. 1 is a perspective view of a drive shaft with a tripot joint.

Referring to FIG. 1, a drive shaft assembly 10 having a constant velocity joint (CVJ), wherein the CVJ is represented as tripot joint 12, by way of example and without limitation, constructed in accordance with one aspect of the disclosure is shown. The tripot joint 12 enables torque transfer between two rotatable shaft members with possible axial position or angular position changes relative to each other. The tripot joint 12 is configured to transmit torque from a first shaft 14 to a second shaft (not shown) through a constant velocity joint spider assembly, referred to hereafter as spider assembly 16, that is connected to the first shaft 14 and operatively connected to the second shaft via a CVJ housing, also referred to as tripot housing 18, through various rotational speeds, joint angles, or telescopic positions.

The tripot housing 18 includes a housing body 20. The housing body 20 has an outer surface 22 and a bore 24 (FIG. 1A) bounded by an inner surface 26. The bore 24 extends along an axis 28 between a first housing end 30 and the second housing end 32. The second shaft member (not shown) can be connected directly to the housing body 20 proximate the second housing end 32.

Figures 1A, 2:
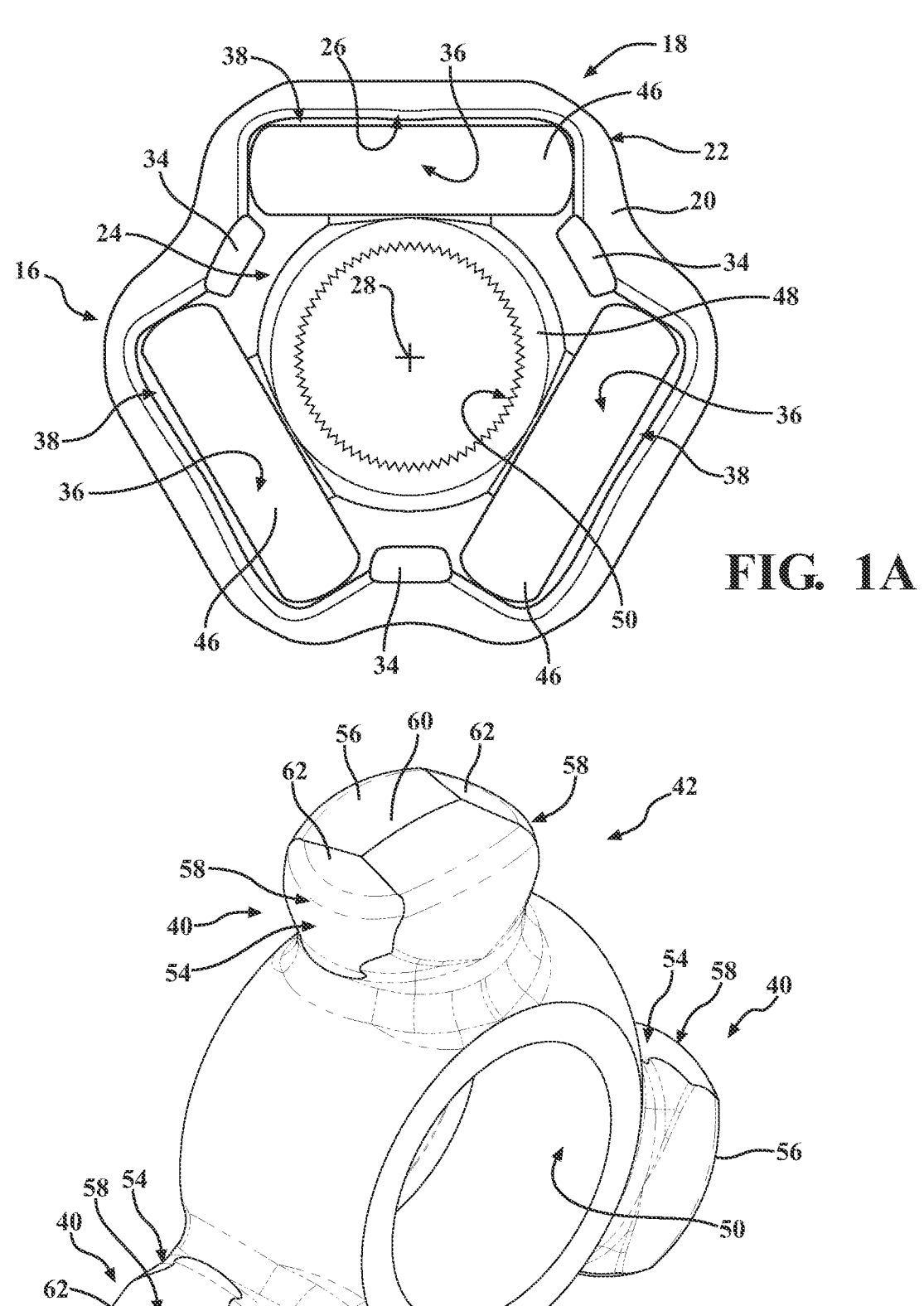
FIG. 1A is a cross-section view of a housing of the tripot joint taken generally along the ling 1A-1A.
FIG. 2 is a perspective view of a spider, constructed in accordance with one aspect of the disclosure, of the tripot joint of FIG. 1.

Referring to FIG. 1A, the inner surface 26 of the housing body 20 defines a plurality of separators 34 and a plurality of roller tracks, also referred to as ball tracks or guide channels 36. Each separator 34 extends radially from the inner surface 26 of the housing body 30 toward the axis 28. The separators 34 extend axially from the first housing end 30 toward the second housing end 32.

Each guide channel 36 extends axially along and is disposed substantially parallel to the axis 28. Each guide channel 36 extends between circumferentially spaced apart separators 34. The guide channels 36 are radially and circumferentially spaced apart from each other about the axis 28 by separators 34 such that each guide channel 36 is bounded in part and disposed between a pair of the separators 34. The guide channels 36 are sized and contoured for rolling translation of ball assemblies 38 of spider assembly 16 there along. Each ball assembly 38 is disposed on a separate trunnion 40 (FIGS. 2-6) of a spider 42 of spider assembly 16, with the ball assemblies 38 being configured for tipping articulation, also referred to as oscillation, on trunnions 40 and to roll along guide channels 36 in translation relative to the housing 18 and in parallel relation with the axis 28.

Each ball assembly 38 has an inner roller member, also referred to as inner ball 44, disposed directly on trunnion 40, and an outer roller member, also referred to as outer ball 46, with rollers, such as needle rollers (not shown), being disposed between the inner ball 44 and the outer ball 46 to facilitate low friction relative rotation of inner ball 44 and outer ball 46 relative to one another, with outer ball 46 being configured and contoured for smooth rolling motion along guide channel 36.

Figure 4:
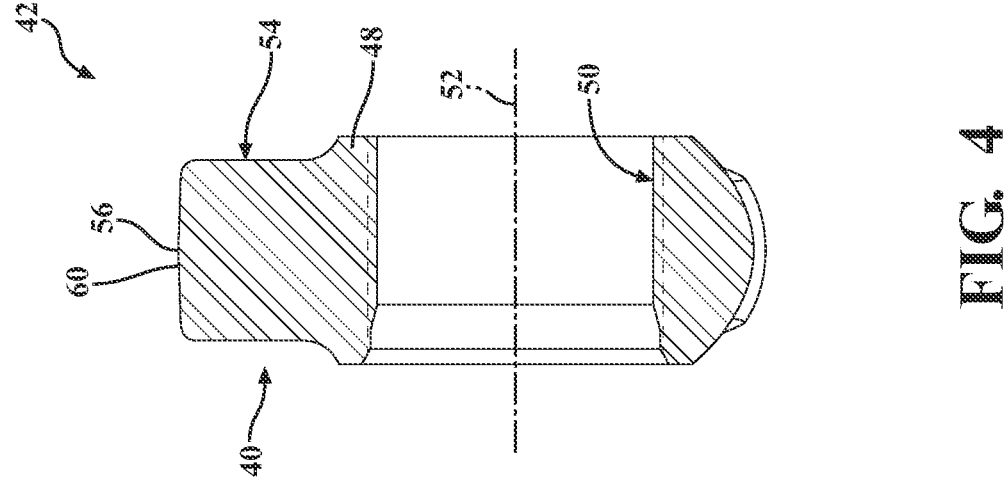
FIG. 4 is a cross-sectional view taken generally along the line 4-4 of FIG. 3.
Figure 3:
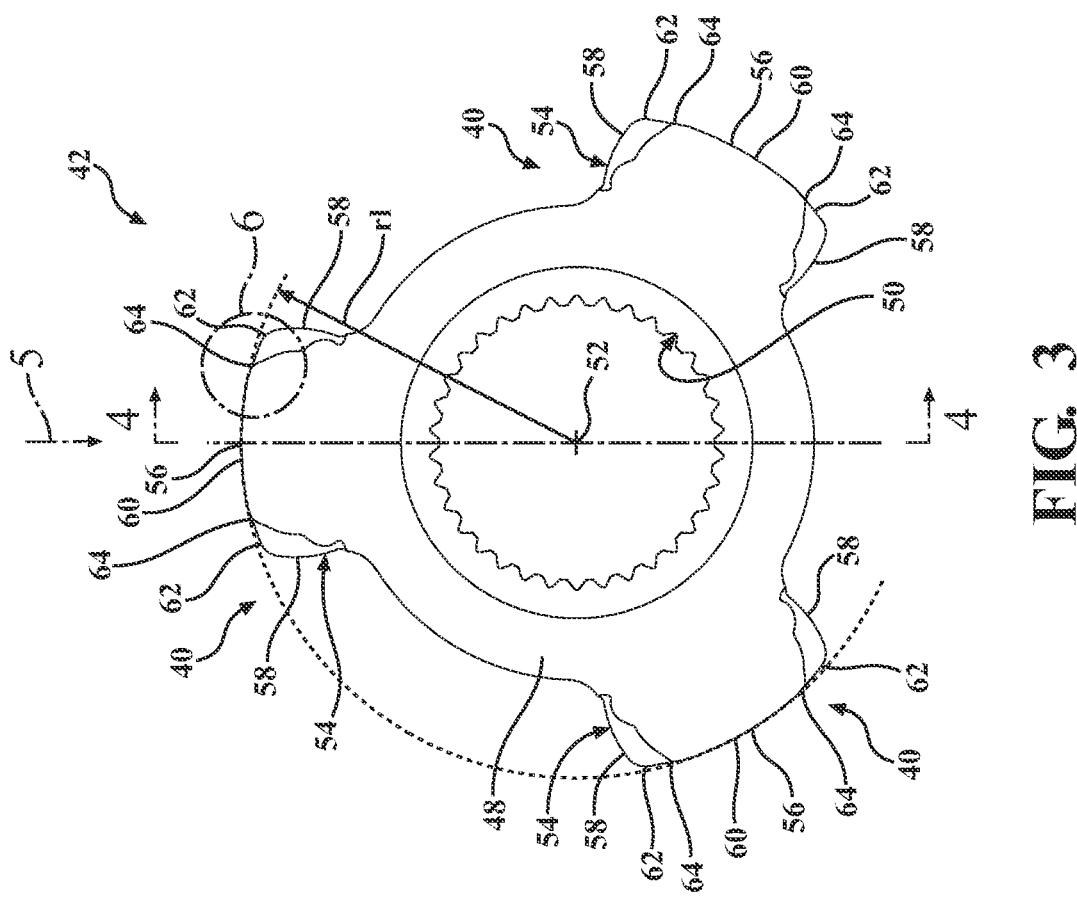
FIG. 3 is a front elevation view looking generally along the arrow 3 of FIG. 2.
Figure 5:
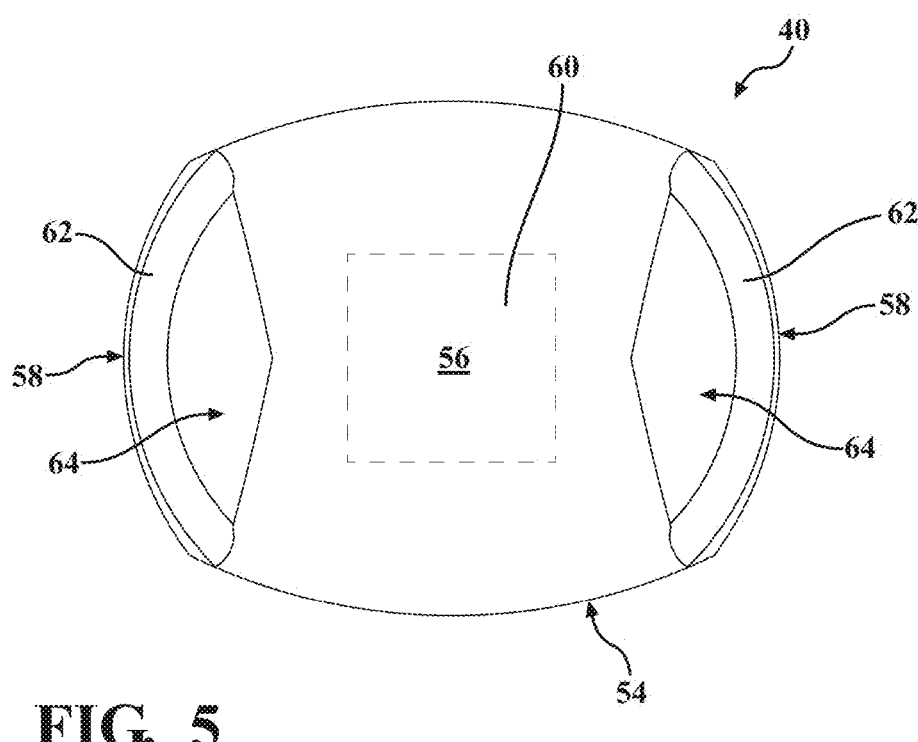
FIG. 5 is a view looking generally along the arrow 5 of FIG. 3.
Figure 6:
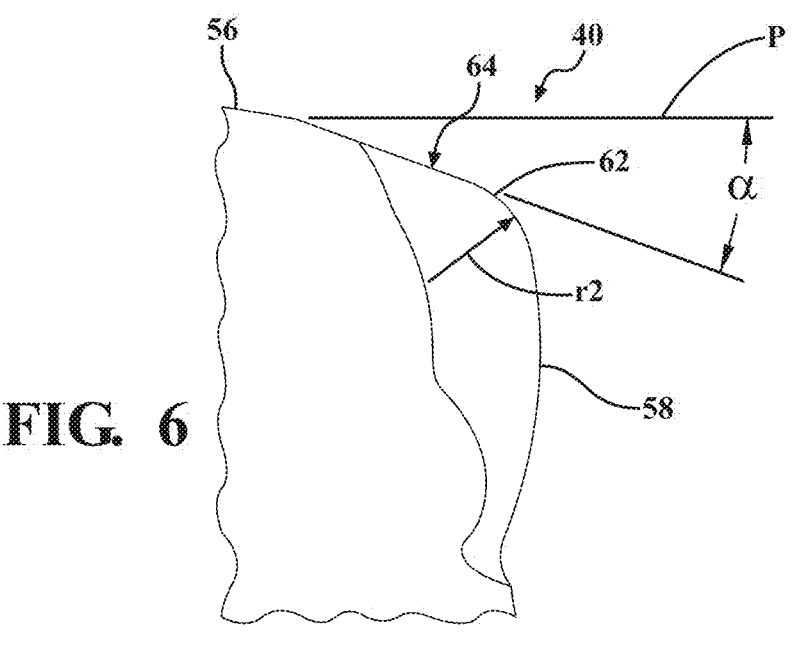
FIG. 6 is an enlarged view of the encircled region 6 of FIG. 3.

With reference to FIGS. 2-4, spider 42, constructed in accordance with one aspect of the disclosure, has an annular body 48 with a through bore 50 extending along a central axis 52. Through bore 50 is sized and contoured for fixation to first shaft 14, and can be splined to first shaft 14, if desired. Each trunnion 40 of spider 42 has an outer surface 54 extending radially outwardly from the annular body 48 in generally transverse relation with the central axis 52 to a free end 56 (free end is intended to mean that the end 56 terminates without being connected to anything). Each outer surface 54 defines at least one contact surface, also referred to as running surface (if circumferentially continuous), and shown as plurality of running surfaces 58, and in one embodiment, a pair of diametrically opposite running surfaces 58. Running surfaces 58 are configured for smooth rotation with an inner surface of inner ball 44, thereby resulting in minimal friction therebetween. A lubrication is provided within spider assembly 16, such as grease, with the grease being free, and desirably urged, to flow between the inner and outer balls 44, 46, about rollers (such as needle rollers, not shown), and between the inner ball 44 and the running surface(s) 58, thereby inhibiting the onset of premature wear and inhibiting the onset of NVH. To facilitate the free, desired flow of grease, each free end 56 has a convex first portion, referred to as first portion 60 having a convex first contour including a first radius r1 and at least one second portion, and shown as a plurality of convex second portions, referred to as second portion 62 having a convex second contour including a second radius r2, with the at least one second portion 62 extending between the first portion 60 and the at least one running surface 58, with the first radius r1 being greater than the second radius r2. In accordance with a non-limiting embodiment, the second radius r2 is between about 1-4 mm, while the first radius r1 is between about 30-35 mm, with the first radius r1 having an origin at the central axis 52. Accordingly, the first radius r1 defines a maximum radius of the free ends 56. The second portions 62 are shown as a pair of second portions 62 located diametrically opposite one another relative to the central axis 52, with each second portion 62 extending from the first portion 60, which is centrally located about and relative to the central axis 52, to the running surfaces 58. As such, one of the second portions 62 extends between the first portion 60 and one of the running surfaces 58, and the other of the second portions 62 extends between the first portion 60 and the other of the running surfaces 58. Accordingly, the first portion 60 separates the second portions 62 in spaced relation from one another.

In accordance with a further aspect of the disclosure, the second portions 62 can include a pair of chamfered surfaces 64. The second radius r2 can extend along and/or from each chamfered surface 64. As such, the second radius r2 can extend from the first radius r1 to the outer surface 54, or from the chamfered surface 64 to the outer surface 54. Accordingly, the chamfered surfaces 64 can extend between each second radius r2 and the first portion 60. Each chamfered surface 64 is inclined from the first surface 60 relative to a plane P (FIG. 12) that extends transversely to the central axis 52, wherein the angle α of inclination is between about 10-45 degrees, and in one non-limiting example embodiment between about 15-25 degrees. The chamfered surfaces 64 decline from the first portion 60 generally toward the annular body 48 to the second radius r2. As such, grease is urged to flow from the first portion 60 along the chamfered surfaces 64 of the second portion 62, over the second radius r2 of the second portion 62 and to the running surfaces 58, thereby maintaining a desired lubrication flow and film between the running surfaces 58 and the inner surface of the inner ball 44.

Figure 7:
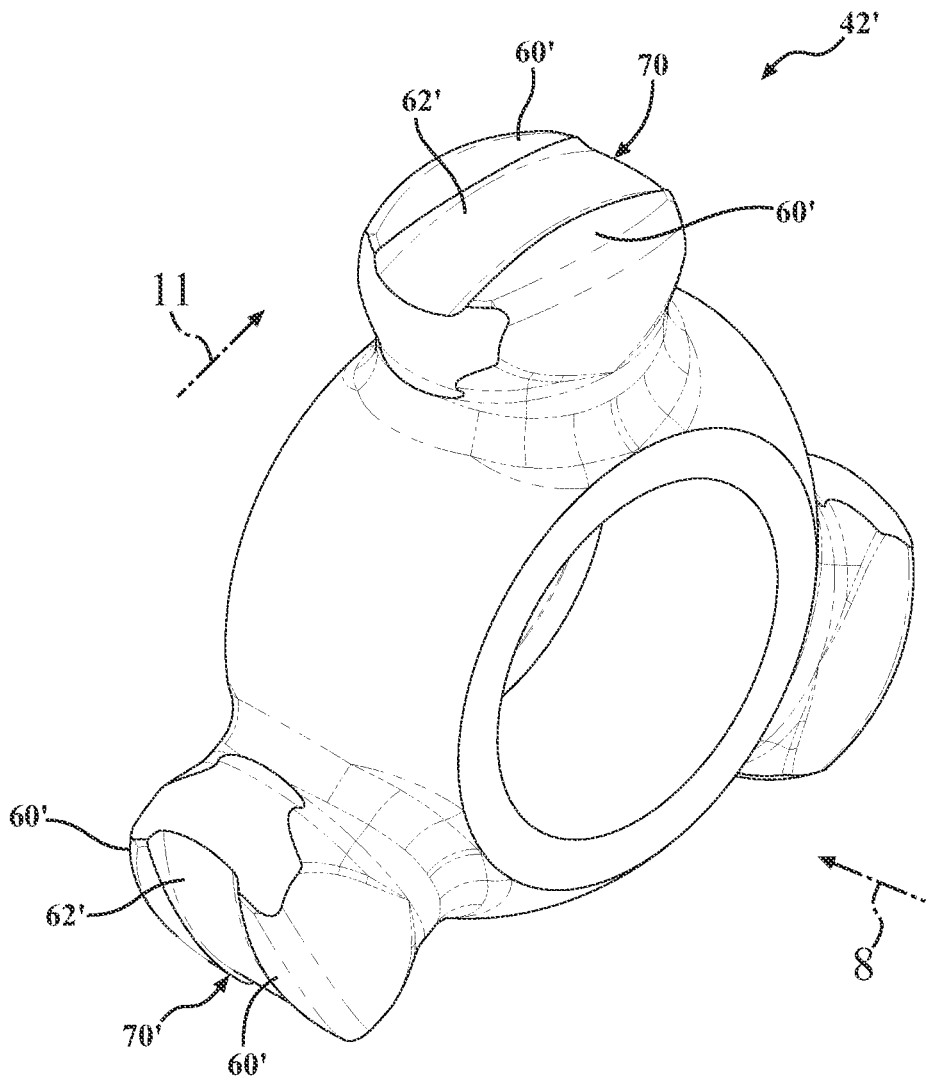
FIG. 7 is a perspective view of a spider, constructed in accordance with another aspect of the disclosure, of the tripot joint of FIG. 1.
Figure 9:
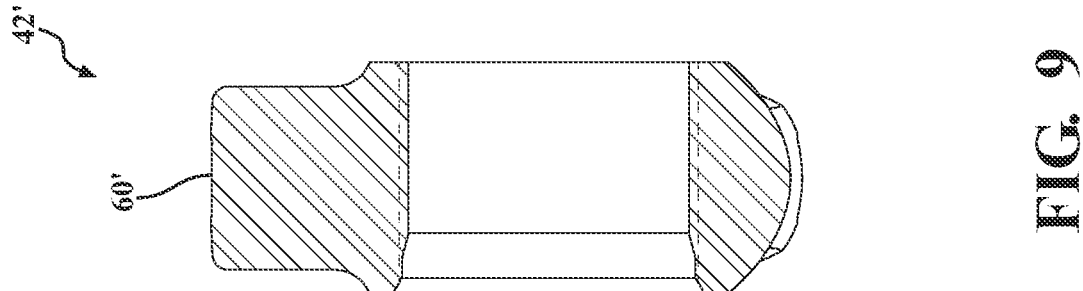
FIG. 9 is a cross-sectional view taken generally along the line 9-9 of FIG. 8.
Figure 8:
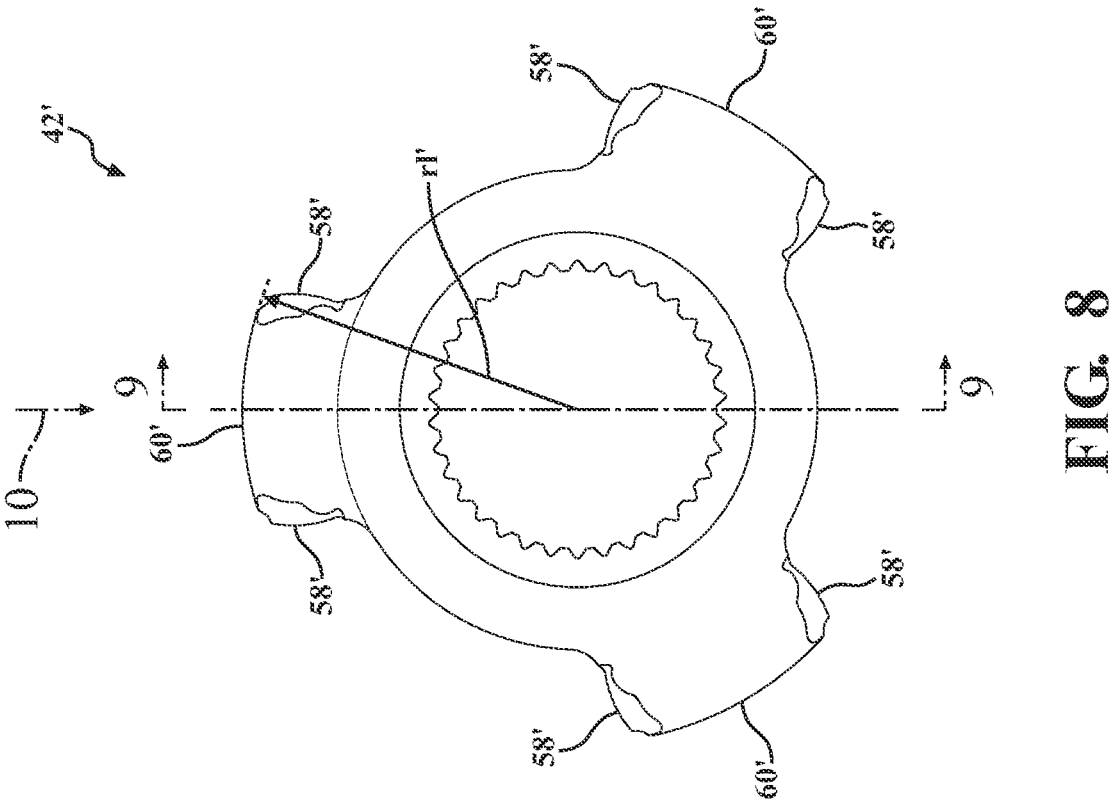
FIG. 8 is a front elevation view looking generally along the arrow 8 of FIG. 7.

With reference to FIGS. 7-9, spider 42', constructed in accordance with another aspect of the disclosure, is shown, wherein the same reference numerals, offset by a prime symbol ('), are used to identify corresponding features. Spider 42' has the at least one second portion 62' formed by a channel, also referred to as slot, groove, or recessed surface 70. Recessed surface 70 is radially recessed along a radial surface 52' from a first portion 60'. Accordingly, recessed surface 70 forms a groove axially recessed, toward the central axis 52' (FIG. 11), from the first portion 60'. The recessed surface 70, as illustrated in one non-limiting embodiment, extends in uninterrupted fashion from one running surface 58' to a diametrically opposite running surface 58'. Accordingly, the recessed surface 70 defines the second portion 62', with the second portion 62' extending continuously from one running surface 58' to the other running surface 58', thereby bisecting the first portion 60' to provide a pair of first portions 60' spaced from one another by the second portion 62'. The first portion 60' has a first radius r1' and the second portion 62' has a second radius r2', with the first radius r1' being greater than the second radius r2'. The second radius r2' of the recessed surface 70 can be formed as a constant radius extending from one running surface 58' to the other running surface 58'. In accordance with a non-limiting embodiment, the second radius r2' is between about 20-25 mm, while the first radius r1' is between about 30-35 mm, with the first radius r1' having an origin at the central axis 52. Grease is channeled to flow along the recessed surface 70 toward the running surfaces 58', thereby prolonging the usefully life of the spider assembly.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A constant velocity joint spider, comprising:
an annular body having a through bore extending along a central axis; and
a plurality of trunnions, each trunnion having an outer surface extending radially outwardly from the annular body in generally transverse relation with the central axis to a free end, each outer surface defining at least one running surface, each free end having a convex first portion having a first radius and at least one convex second portion having a second radius, the at least one convex second portion extending between the convex first portion and the at least one running surface, the first radius being greater than the second radius.

2. The constant velocity joint spider of claim 1, wherein the at least one running surface includes a pair of diametrically opposite running surfaces, and the at least one convex second portion includes a pair of convex second portions, one of the convex second portions extending between the convex first portion and one of the running surfaces, and the other of the convex second portions extending between the convex first portion and the other of the running surfaces.

3. The constant velocity joint spider of claim 2, wherein each second radius is between about 1-4 mm.

4. The constant velocity joint spider of claim 2, further including a pair of chamfered surfaces, the convex second portions being formed along the chamfered surfaces.

6

5. The constant velocity joint spider of claim 4, wherein each chamfered surface is inclined relative to a plane extending generally transversely to the central axis between about 10-45 degrees.

6. A constant velocity joint, comprising:
a housing body having an inner surface bounding a bore, the bore extending along an axis between a first housing end and a second housing end;
a plurality of guide channels that extend axially from the first housing end toward the second housing end with the plurality of guide channels being radially spaced apart from each other about the longitudinal axis by separators;
a spider having an annular body with a through bore extending along a central axis and a plurality of trunnions, each trunnion having an outer surface extending radially outwardly from the annular body in generally transverse relation with the central axis to a free end, each outer surface defining at least one running surface; and
a plurality of ball assemblies, each ball assembly supported for rotation by the at least one running surface of a separate one of the trunnions,
wherein the free end of each trunnion has a convex first portion having a first radius and at least one convex second portion having a second radius, the at least one convex second portion extending between the convex first portion and the at least one running surface, the first radius being greater than the second radius.

7. The constant velocity joint of claim 6, wherein the at least one running surface includes a pair of diametrically opposite running surfaces, and the at least one convex second portion includes a pair of convex second portions, one of the convex second portions extending between the convex first portion and one of the running surfaces, and the other of the convex second portions extending between the convex first portion and the other of the running surfaces.

8. The constant velocity joint of claim 7, wherein each second radius is between about 1-4 mm.

9. The constant velocity joint of claim 7, further including a pair of chamfered surfaces, the convex second portions being formed by the chamfered surfaces.

10. The constant velocity joint of claim 9, wherein each chamfered surface is inclined relative to a plane extending generally transversely to the central axis between about 10-45 degrees.

* * * * *